(12) United States Patent
Kavsan

(10) Patent No.: US 8,266,118 B2
(45) Date of Patent: Sep. 11, 2012

(54) AUTOMATED ACCESS POLICY TRANSLATION

(75) Inventor: Bronislav Kavsan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1253 days.

(21) Appl. No.: 12/027,971

(22) Filed: Feb. 7, 2008

(65) Prior Publication Data

US 2009/0204971 A1    Aug. 13, 2009

(51) Int. Cl.
*G06F 7/00*     (2006.01)
(52) U.S. Cl. ........................................................ 707/694
(58) Field of Classification Search ................... 707/694, 707/668
See application file for complete search history.

(56) References Cited

U.S. PATENT DOCUMENTS

| | | |
|---|---|---|
| 2003/0084168 A1 | 5/2003 | Erickson et al. |
| 2003/0088786 A1 | 5/2003 | Moran et al. |
| 2004/0225896 A1 | 11/2004 | Ng |
| 2005/0251853 A1 | 11/2005 | Bhargavan et al. |
| 2006/0041636 A1 | 2/2006 | Ballinger et al. |
| 2006/0230430 A1 | 10/2006 | Hondo et al. |
| 2007/0124797 A1 | 5/2007 | Gupta et al. |
| 2007/0130520 A1 | 6/2007 | Skunberg et al. |
| 2007/0136578 A1 | 6/2007 | Dubhashi et al. |
| 2007/0180490 A1 | 8/2007 | Renzi et al. |
| 2007/0283443 A1* | 12/2007 | McPherson et al. ............ 726/26 |

OTHER PUBLICATIONS

Access Control for Collaborative Systems: A Web Services Based Approach (8 pages) http://ieeexplore.ieee.org/xpl/freeabs_all.jsp?tp=arnumber=4279707&isnumber=4279.
An Attribute and Role Based Access Control Model for Web Services (5 pages) http://ieeexplore.ieee.org/xpl/freeabs_all.jsp?tp=&arnumber=15271448&isnumber=32624.
Introduction: Security (7 pages) http://publib.boulder.ibm.com/infocenter/wsdoc400/v6r0/index.jsp?topic=/com.ibm.websphere.iseries.doc/info/ae/ae/welc_security.html.
An Access Control Model for Web Services in Business Process (7 pages) http://ieeexplore.ieee.org/xpl/freeabs_all.jsp?tp=&arnumber=1410817&isnumber=30573.

* cited by examiner

*Primary Examiner* — Truong Vo
(74) *Attorney, Agent, or Firm* — Workman Nydegger

(57) ABSTRACT

The use of one resource access policy to populate a second resource access policy. One of more fields of the first resource access policy are each to be used to populate corresponding one or more fields of the second resource access policy. After identifying the field(s) of the first resource access policy, and identifying their corresponding field of the second resource access policy, the information from the source fields of the first resource access policy are then used to populate the destination fields of the second resource access policy. This may be done in an automated fashion thereby allowing for at least the possibility of the transition from one type of resource access security to another.

10 Claims, 3 Drawing Sheets

AUTOMATED ACCESS POLICY TRANSLATION

BACKGROUND

In computing environments, it is often desired to control access to a particular resource. Examples of such resources include files, directories, databases, applications, modules, data structures, drivers, and so forth. There are a variety of conventional mechanisms for controlling access to a resource. For instance, Access Control Lists (ACLs) are associated with a resource and essentially define an access control policy for accessing that resource. The ACL includes a number of Access Control Elements (ACEs) that each define access permissions for a corresponding principal. The principal may be a particular user or another entity, such as another application, or perhaps a group of users and/or applications. As the resource is requested by a particular principal, the ACL for that resource is checked to verify that the requested principal has the permission to perform the requested action on the resource. The principal is then responded to by either denying or granting the requested access. In ACL-based access control models, the principal does not typically know of the underlying policy for controlling access to a resource.

Other conventional access control policy approaches have a more flexible mechanism for defining policy. For example, Web Service (WS) is a set of specifications for providing network-based services. One of those specifications is WS-SecurityPolicy. If a principal were to make a request to access a resource, a resource manager may respond with the actual policy that is to be satisfied in order to access the resource. Typically, in WS-SecurityPolicy, this policy information is provided in the form of an eXtensible Markup Language (XML) structure to the principal. The principal may then comply with that policy. The construction of policy can tend to be labor intensive.

Accordingly, there is a diversity of technology in controlling access to resources through the use of policy.

BRIEF SUMMARY

Embodiments described herein relate to the use of one resource access policy to populate a second resource access policy. One or more fields of the first resource access policy are each to be used to populate corresponding one or more fields of the second resource access policy. After identifying the field(s) of the first resource access policy, and identifying their corresponding field of the second resource access policy, the information from the source fields of the first resource access policy are then used to populate the destination fields of the second resource access policy. This may be done in an automated fashion thereby allowing for at least partial automated translation from one type of resource access policy to another.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, an at least partial automated conversion is described for converting between different resource access policy types. For instance, one might convert from Access Control Lists (ACLs) to WS-SecurityPolicy in at least a partially automated fashion. First, some introductory discussion regarding message processors will be described with respect to FIG. 1. Then, various embodiments of a mechanism for converting between resource access policies will be described with respect to FIGS. 2 through 4.

Figure 1:
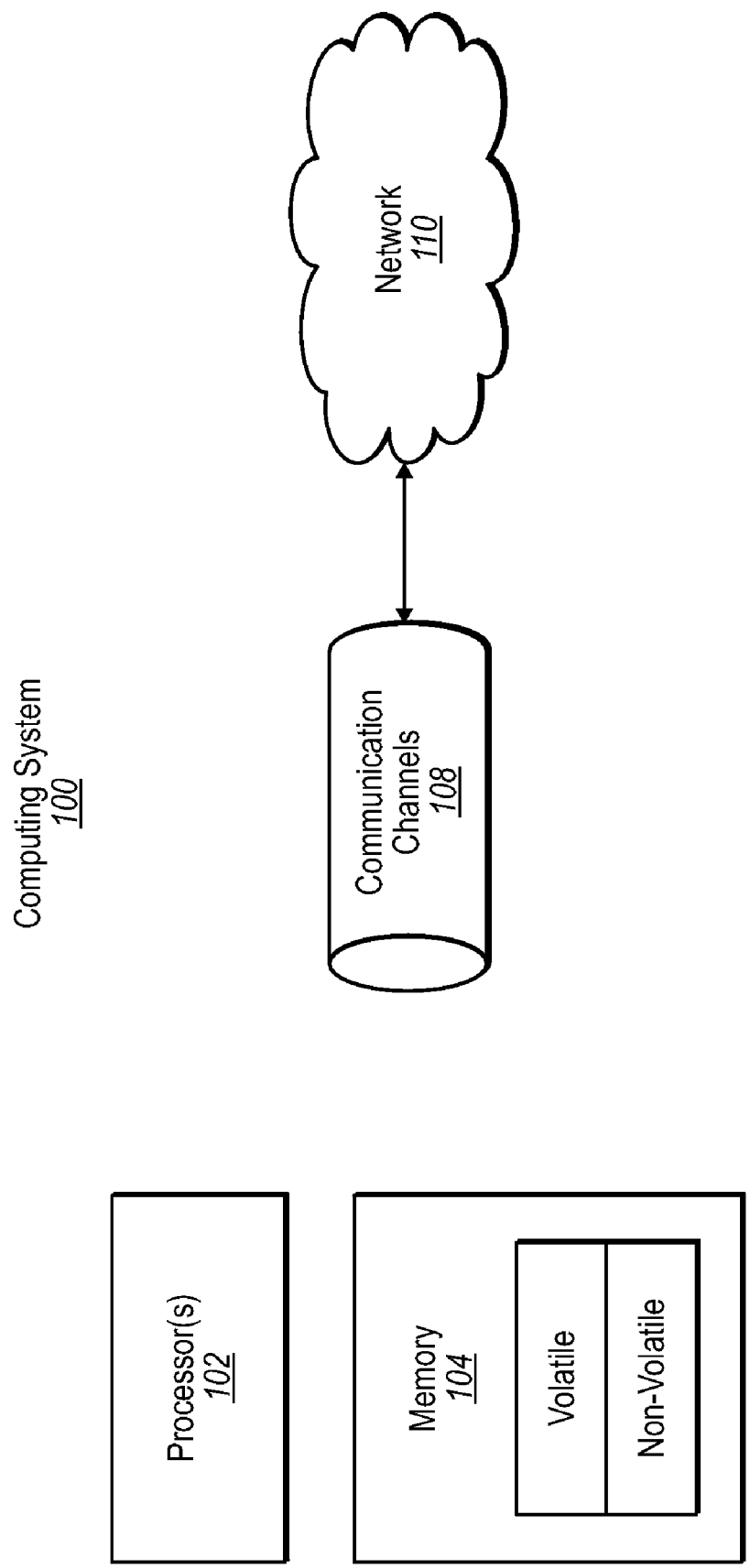
FIG. 1 illustrates an example computing system that may be used to employ embodiments described herein.

A message processor may be implemented in software or hardware, or a combination thereof FIG. 1 illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems. That said, a "message processor" is not even limited to use in a computing system at all.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter as defined in the appended claims is not necessarily limited to the specific features or acts described herein. Rather, the specific features and acts described herein are disclosed as example forms of implementing the claims.

Figure 2:
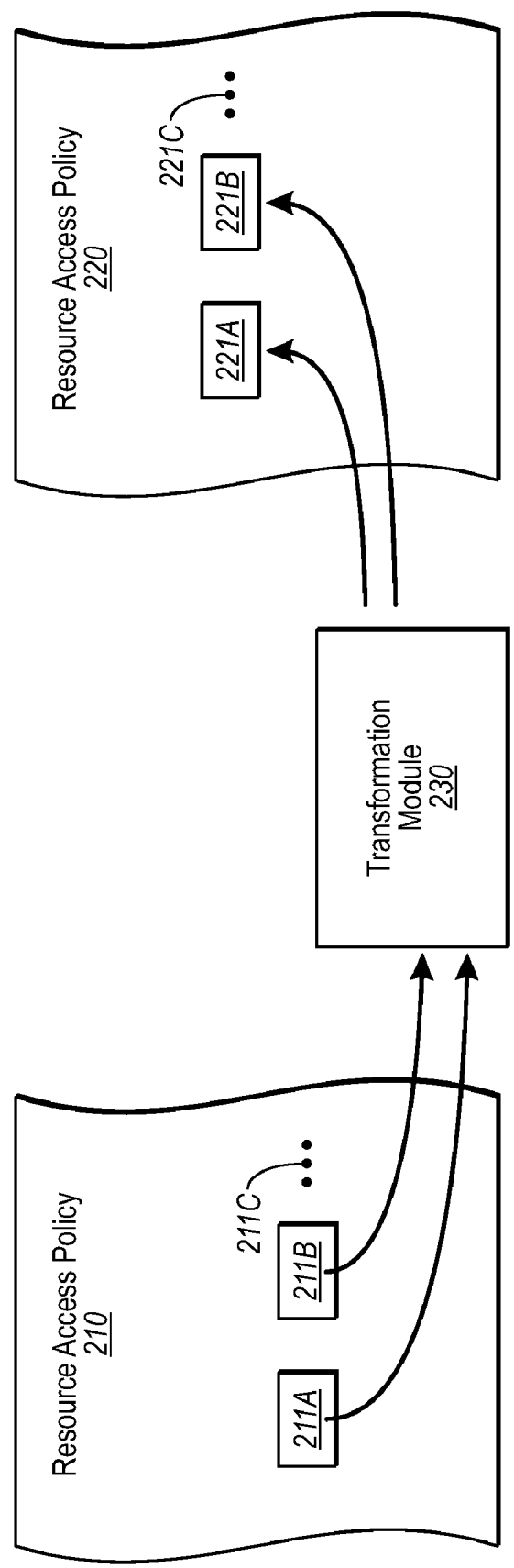
FIG. 2 illustrates an example data flow in automatically transforming policy information from one type of policy data structure into another type of policy data structure.

FIG. 2 illustrates a process flow involving a transformation module 230 operating upon a first resource access policy 210 and a second resource access policy 220. Each resource access policy 210 and 220 describe policy for accessing a corresponding resource, such as a file, directory, database, module, application, service, data structure, or any other resource that can be maintained by a computing system.

The first resource access policy 210 has one or more data fields 211A and 211B that may have their contents read and used to populate one or more corresponding data fields 221A, 221B and 221C of the second resource access policy 220. The ellipses 211C and 221C are used to symbolically represent that the first resource access policy 210 may have one or any number of data fields that are read in order to populate one or any number of data fields of the second resource access policy. The contents read by the transformation module 230 may be used to populate by just copying the contents into the appropriate location of the second resource access policy 220. On the other hand, some transformation of the read contents may be performed before populating the second resource access policy with the transformed contents. A single data field of the first resource access policy 210 may be used to populate just one data field of the second resource access policy 220. Alternatively, a single data field of the first resource access policy 210 may be used to populate multiple data fields of the second resource access policy 220.

As one example, the first resource access policy 210 may be an Access Control List (ACL) that specifies policy for accessing a resource. ACLs are widely as used presently to control access to resources. When a request for a resource having an associated ACL is received, the ACL is consulted to verify whether or not the requestor has permissions to perform the requested act on the associated resource. The first resource policy 210 might also be a modified ACL that is structured different from conventional ACLs.

Figure 3:
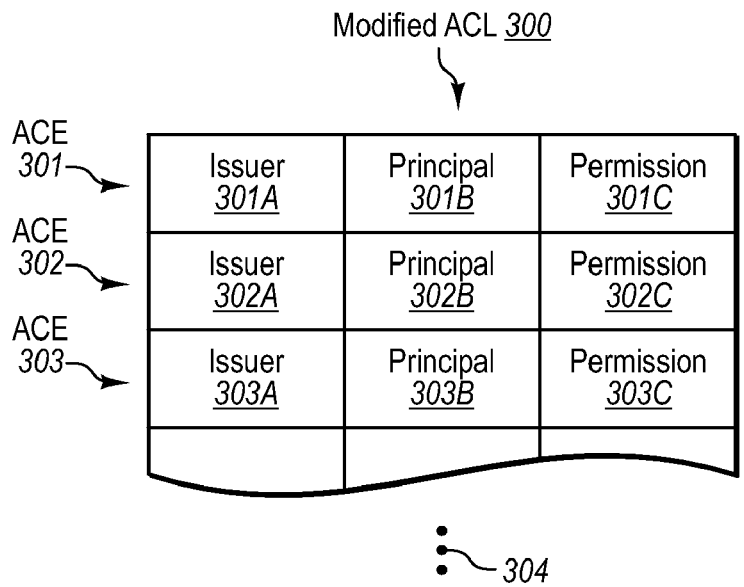
FIG. 3 illustrates a data structure of a modified Access Control List consistent with embodiments described herein.

FIG. 3 illustrates a data structure of a modified ACL 300. The modified ACL includes a plurality of Access Control Elements 301, 302, 303. The ellipses 304 symbolizes that the ACL may contain any number (one or more) of Access Control Elements. Each access control element includes a permissions field 301C through 303C that describe an access permission associated with a resource protected by the ACL. Each access control element also includes a principal field 301B through 303B that identifies a principal to which the associated permission is to be applied. A principal might be a user (either a human user or a computing entity such as another application). The principal might also be a group identity to which multiple other entities belong. A user might belong to multiple groups. The principal and permission field together specify the access permissions that are to apply to that principal should a request to access the resource be received from that principal.

Unlike conventional ACLs, at least one, and potentially all of the access control elements of the ACL include an issuer field 301A through 303A. The issuer field identifies the entity that asserts membership in the group. For example, in conventional ACLs, it is the Active Directory that is consulted in order to identify the groups that an entity belongs to. For access control elements in which the principal field specifies a group, the issuer field might include the identity of the entity that asserts membership in a particular group, the entity that identified the group, or some other claim regarding the group.

Although not required, as previously mentioned, the first resource access policy 210 may be an Access Control List (ACL) or a modified ACL (as illustrated and/or described with respect to FIG. 3). In this embodiment, or in any other embodiment, the second resource access policy might be a hierarchically structured data structure such as, for example, an eXtensible Markup Language (XML) data structure. The following specifies an example XML data structure that is consistent with WS-SecurityPolicy that might represent an example of the second resource access policy with line numbering added for purpose of clarity.

```
1.   <s:Envelope>
2.     <s:Header> ... </s:Header>
3.     <s:Body>
4.       ...
5.       <wsp:Policy>
6.         <sp:Issuer>
7.           [Issuer Identity]
8.         </sp:Issuer>
9.         <wst:Claims>
```

```
10.         [Claim]
11.       </wst:Claims>
12.     </wsp:Policy>
13.   </s:Body>
14. </s:Envelope>
```

In this example, lines 1-14 represent a Simple Object Access Protocol (SOAP) envelope. Of course, SOAP envelopes include a header portion (see line 2) which contains some content symbolically represented by the ellipses in line 2. SOAP envelopes also include a body element which, in this example, spans from line 3 through line 13. The body element includes, amongst other things, a Policy element as defined by WS-Policy, which in this example spans from lines 5 through 12. The Policy element is a policy data structure that represents an example of the resource access policy 220 of FIG. 2.

The second resource access policy might be an eXtensible Markup Language (XML) data structure. In this example, the transformation module 220 may, for example, identify an issuer of a group principal represented in an access control element of an ACL and populate the issuer field (at line 7 of the example). In addition, the transformation module 220 may identify principal of that access control element, and populate the claim field (at line 10 of the example) with a statement regarding the group principal. Accordingly, the policy will trust that a statement that the requestor is a member of a group principal if the statement is issued by a particular issuer specified in line 7 of the example.

ACLs are widely used to control access to resources. The principles described herein permit other resource access policies to be at least partially automatically constructed by extracting components of ACLs and populating appropriate portions of the other resource access policies. This could be a labor intensive process if not for this automated process. Some manual construction of the resource access policy might also be performed. However, by at least partially automating the process, the labor intensity of this process can be at least partially reduced.

Figure 4:
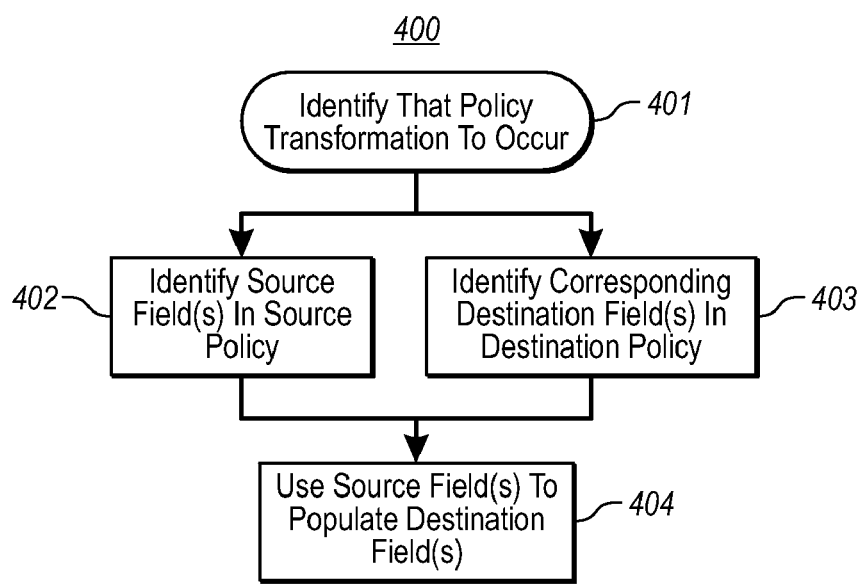
FIG. 4 illustrates a flowchart of a method for at least partially using one resource access policy to generate a second resource access policy.

FIG. 4 illustrates a flowchart of a method 400 transforming a resource access policy of a first type to at least partially populate a resource access policy of a second different type. For instance, as mentioned above, the first resource access policy might be an ACL which tends to hide the access control policy from entities requesting a resource, and the second resource access policy might be a policy that exposes the policy for accessing the resource to the requester.

The method 400 is initiated by determining that a policy of a first resource access policy of a first type is to be populated into a second resource access policy of a second different type (act 401). For instance, the transformation module 220 may determine that the first resource access policy 210 (perhaps an ACL) is to have some of its policy incorporated into the second resource access policy (perhaps a policy element of an XML data structure).

Then, the policy data field(s) that are to be read from the first resource access policy are identified (act 402). For instance, in FIG. 2, the data fields 211A and 211B might be read from the first resource access policy 210. If the first resource access policy is an ACL, for example, the data fields might include the principal fields for each access control element in the ACL. The data fields might also include an associated issuer field, if any, for each principal.

For each of the one or more identified data fields of the first resource access policy. The method also includes the identification of an appropriate corresponding one or more positions of the second resource access policy to populate into (act 403). For example, if the second resource access policy were an XML data structure, a corresponding value field of a name-value pair may be identified as corresponding to a data field of the first resource access policy. For instance, if the ACL is a modified ACL having an issuer field, the content of the issuer field may correspond to line 7 of the example XML data structure presented above. Thus, the issuer field of an access control element of the ACL may be used to populate line 7 of the example XML data structure presented above. Otherwise, if the ACL is not a modified ACL and does not include an issuer field, the transformation module 220 may simply insert a default issuer (e.g., the Active Directory that governs the system in which the resource protected by the ACL is placed).

As another example, for a given access control element in the ACL, the access control element may include a group principal. Accordingly, the corresponding field that is to be populated using the group principal may be the [Claim] portion in line 10 of the XML example presented above.

Then, for each of the one or more identified data fields of the first resource access policy, the method 400 uses the identified data field of the first resource access policy to populate the corresponding one or more positions of the second resource access policy (act 404). For example, the issuer field content from the access control element of the ACL may be used to populate the issuer element of the XML example, and the principal field content from the same access control element may be used to populate the claims element of the XML example. For instance, the content may be copied into the appropriate corresponding field, without transformation, or perhaps with some transformation. In one example, the content is read from the first resource access policy, and then a structured element that includes the content is then constructed for inclusion into the appropriate portion of the second resource access policy.

Accordingly, resource access policies of one type may be used to automatically populate at least portions of resource access policies of other types. For example, conventional resource access policies such as ACLs may be used to automatically construct other more recently developed resource access policies. This allows for the updating of access policies to be less labor intensive.

The present invention may be embodied in other specific forms without as departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage devices having thereon computer-executable instructions that, when executed by one or more processors of a computing system, causes the computing system to perform a method for automated access policy translation, the method comprising:

an act of accessing a first resource access policy comprised of an access control list (ACL) having a plurality of access control elements, each element having one or more data fields that define an access permission associated with a resource, and a principal to which the associated permission is to be applied;

an act of accessing a second resource policy comprised of a hierarchically structured data structure;

an act of identifying one or more data fields of the first resource access policy that are to be used to populate at least a portion of the hierarchical data structure of the second resource access policy;

for each of the one or more identified data fields of the first resource access policy, an act of identifying an appropriate corresponding one or more positions within the hierarchical data structure of the second resource access policy which are to be populated by the identified one or more data fields from the ACL of the first resource access policy; and for each of the one or more identified data fields in the ACL of the first resource access policy, an act of copying the identified one or more data fields into the corresponding one or more positions within the hierarchical data structure of the second resource access policy in order to automatically populate the corresponding one or more positions within the hierarchical data structure of the second resource access policy.

2. A computer program product in accordance with claim 1, wherein the second resource access policy is an eXtensible Markup Language (XML) data structure.

3. A computer program product in accordance with claim 2, wherein the identified one or more data fields of the ACL identify a group principal.

4. A computer program product in accordance with claim 3, wherein the one or more positions within the hierarchical data structure of the second resource access policy which are to be populated by the identified one or more data fields from the ACL of the first resource access policy correspond to one or more data fields of the XML data structure, the corresponding one or more data fields of the XML data structure defining a value field of a name-value pair corresponding to a claims element.

5. A computer program product in accordance with claim 4, wherein the identified one or more data fields of the ACL further includes an issuer data field that identifies an entity that asserts membership in a particular group.

6. A computer program product in accordance with claim 5, wherein the one or more positions within the hierarchical data structure of the second resource access policy which are to be populated by the identified one or more data fields from the ACL of the first resource access policy correspond to one or more data fields of the XML data structure, the corresponding one or more data fields of the XML data structure defining a value field of a name-value pair corresponding to an issuer element.

7. A computer program product in accordance with claim 1, wherein the second resource access policy is a WS-SecurityPolicy data structure.

8. A computerized method for automated access policy translation comprising:

an act of accessing a first resource access policy comprised of an access control list (ACL) having a plurality of access control elements, each element having one or more data fields that define an access permission associated with a resource, and a principal to which the associated permission is to be applied, and at least one of the access control elements of the ACL having an issuer field that identifies an entity that asserts membership in a particular group;

an act of accessing a second resource policy comprised of a hierarchically structured data structure;

an act of identifying one or more data fields of the first resource access policy that are to be used to populate at least a portion of the hierarchical data structure of the second resource access policy;

for each of the one or more identified data fields of the first resource access policy, an act of identifying an appropriate corresponding one or more positions within the hierarchical data structure of the second resource access policy which are to be populated by the identified one or more data fields from the ACL of the first resource access policy; and for each of the one or more identified data fields in the ACL of the first resource access policy, an act of copying the identified one or more data fields into the corresponding one or more positions within the hierarchical data structure of the second resource access policy in order to automatically populate the corresponding one or more positions within the hierarchical data structure of the second resource access policy.

9. The computerized method in accordance with claim 8, wherein the identified one or more data fields of the first resource access policy include the issuer field, which identifies an active directory associated with the ACL, and wherein copying the identified one or more data fields into the corresponding one or more positions within the hierarchical data structure of the second resource access policy comprises copying the issuer data field into a corresponding issuer portion of the hierarchical data structure in order to automatically populate the issuer portion of the hierarchical data structure.

10. The computerized method in accordance with claim 8, wherein prior to the act of populating the issuer portion of the hierarchically data structure, the method comprises:

an act of determining whether the ACL contains an issuer field.

\* \* \* \* \*